Feb. 16, 1943.   F. M. REID   2,311,252
VEHICLE UNDERCARRIAGE AND BRAKE OPERATING MECHANISM
Filed July 31, 1941   3 Sheets-Sheet 1

INVENTOR
Frederick M. Reid
BY Harness, Dickey & Pierce
ATTORNEYS.

Feb. 16, 1943.  F. M. REID  2,311,252
VEHICLE UNDERCARRIAGE AND BRAKE OPERATING MECHANISM
Filed July 31, 1941  3 Sheets-Sheet 2
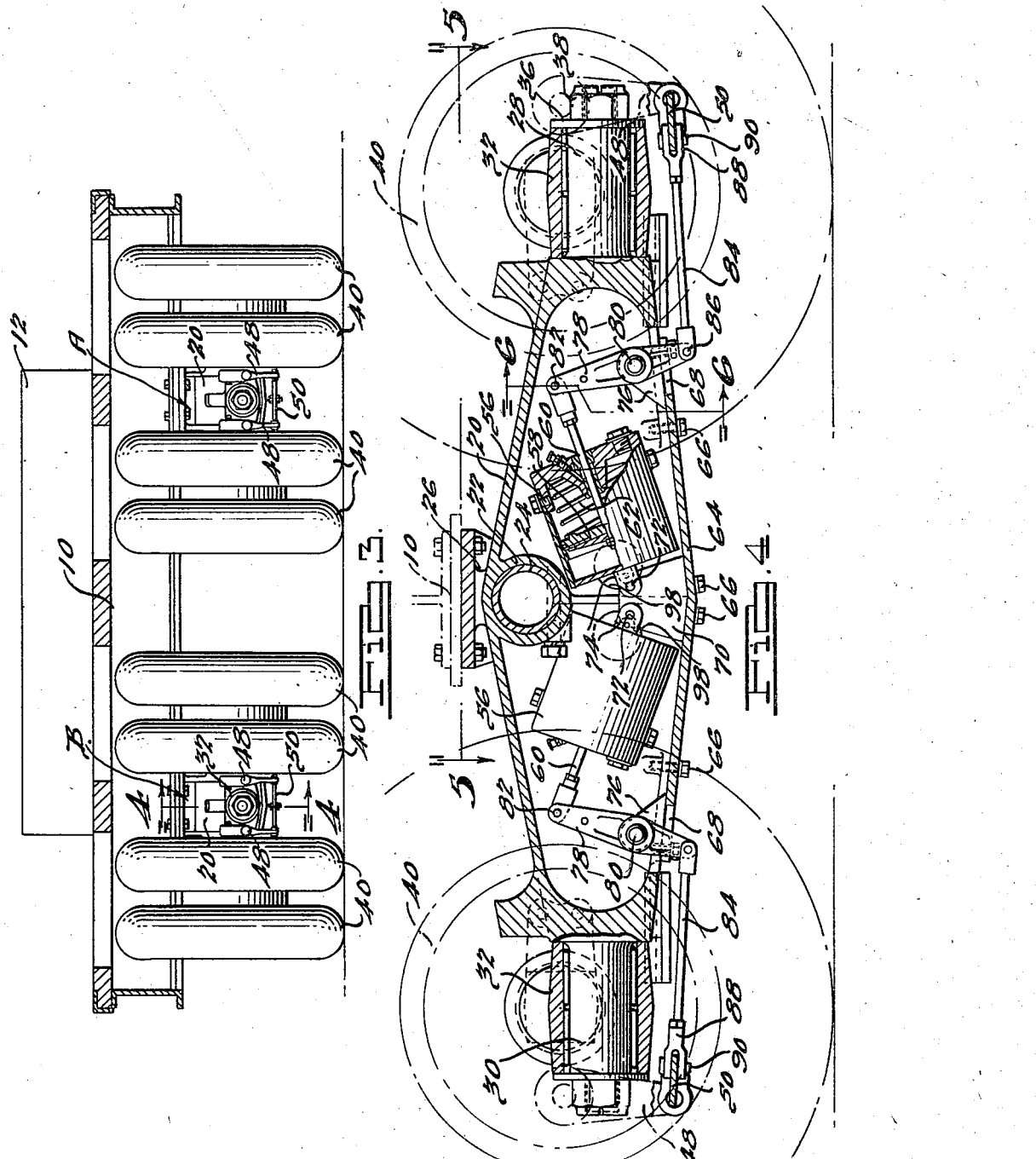
INVENTOR
Frederick M. Reid.
BY
Harness, Dickey & Pierce
ATTORNEYS.

Feb. 16, 1943.   F. M. REID   2,311,252
VEHICLE UNDERCARRIAGE AND BRAKE OPERATING MECHANISM
Filed July 31, 1941   3 Sheets-Sheet 3
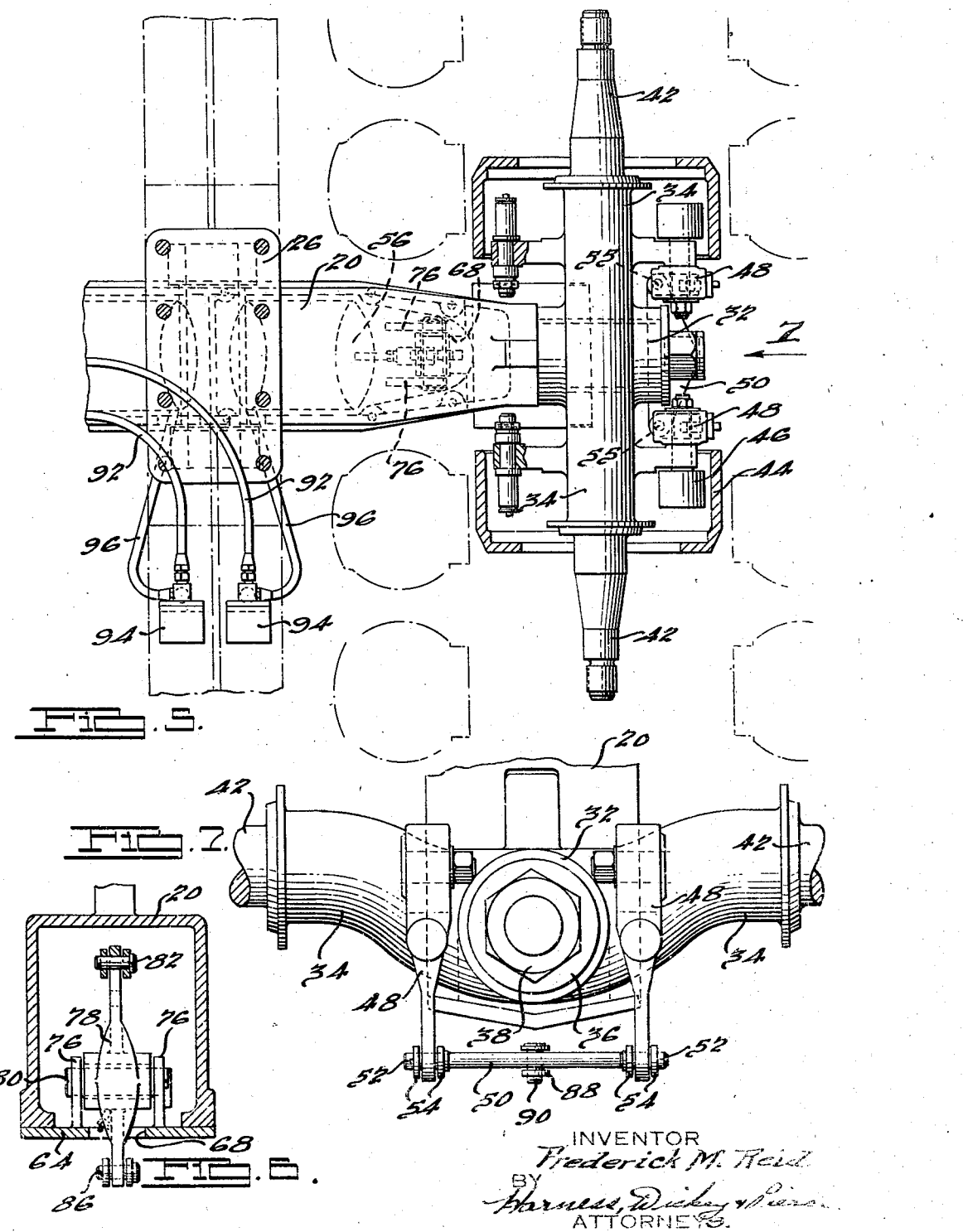
INVENTOR
Frederick M. Reid
BY
Harness, Dickey & Pierce
ATTORNEYS.

Patented Feb. 16, 1943

2,311,252

UNITED STATES PATENT OFFICE 2,311,252

VEHICLE UNDERCARRIAGE AND BRAKE OPERATING MECHANISM

Frederick M. Reid, Detroit, Mich., assignor to Fruehauf Trailer Company, Detroit, Mich., a corporation of Michigan Application July 31, 1941, Serial No. 404,750

10 Claims. (Cl. 188—152)

The present invention relates to improvements in heavy duty vehicle undercarriage constructions having brake operating mechanisms associated therewith and particularly relates to improvements in constructions such as that disclosed in United States Patent to Frederick M. Reid, No. 1,690,247, granted November 6, 1928.

One of the primary objects of the present invention is to provide improvements in constructions of the type mentioned in which the brake operating mechanism is so constructed and arranged as to take up a minimum of room, so that it may advantageously be installed where very little room is available.

A further object of the invention is to provide improvements in constructions of the type mentioned in which the brake operating mechanism is compactly arranged and is directly mounted on an oscillating trunnion beam so that such mechanism and the operation thereof will not be affected by the oscillation of the beam.

A further object of the invention is to provide a self-enclosed or self-contained brake operating mechanism which is associated with an oscillating trunnion, in which the brake operating mechanism may be readily applied or assembled and in which such mechanism is well protected from flying stones and the like.

Other objects of the invention will become apparent from the following specification, the drawings relating thereto, and from the claims hereinafter set forth.

In the drawings in which like numerals are used to designate like parts in the several views throughout:

Fig. 3 is an enlarged, vertical cross-sectional view, with parts in elevation, taken substantially along the line 3—3 of Fig. 1;

Fig. 4 is an enlarged, vertical cross-sectional view, taken substantially along the line 4—4 of Fig. 3;

Fig. 5 is a top plan view, with parts broken away, and showing parts in cross-section, taken substantially along the line 5—5 of Fig. 4;

Fig. 6 is a cross-sectional view, taken substantially along the line 6—6 of Fig. 4; and Fig. 7 is a rear elevational view, taken in the direction of the arrow 7 of Fig. 5.

Figure 1:
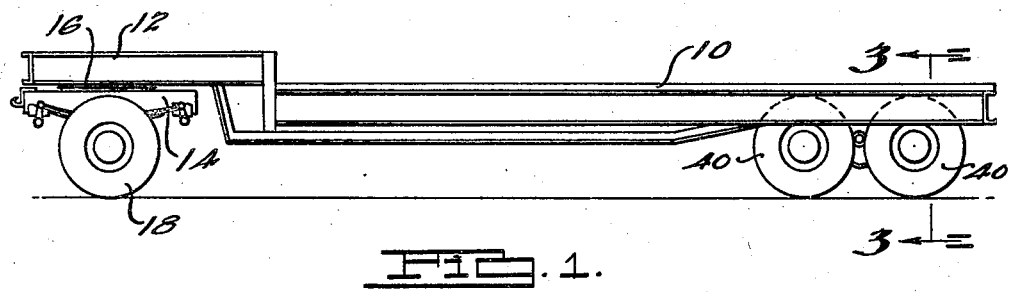
Figure 1 is a side elevational view of a heavy duty vehicle of the trailer type, embodying the present invention.

As shown in Fig. 1, and as disclosed in the patent above referred to, the vehicle of the type to which the present invention is particularly adapted is quite long and wide, and also relatively low, so that there is very little room available for the wheel mountings and for the application of the associated brake mechanism. Vehicles of this type carry exceedingly heavy loads and a number of wheels are used, there being eight of such wheels of the dual tire type at the rear end of the trailer, in the embodiment illustrated. It has been a serious problem to properly apply and mount the brake operating mechanisms in constructions of this type, and the present invention is directed at the solution of this problem. It will be appreciated that, besides there being very little room available for the application of the brake mechanism, such mechanism should be as simple as possible, so that as few repairs as possible are required. However, the construction is such that when repairs are needed, such repairs may be quickly made.

Referring to the drawings, the vehicle shown consists of a chassis frame and platform 10, which is preferably constructed so as to be relatively close to the ground. The forward end of the frame is elevated, as indicated at 12, and is supported on a sub-frame 14 and connected thereto through a fifth wheel construction 16. Such sub-frame 14 is mounted on the front wheels 18 by means of springs, although such springs may be eliminated, if desired. The vehicle is adapted to be drawn by a tractor, which is secured to the front end thereof. Instead of mounting the forward end 12 on the sub-frame 14, such forward end may be mounted directly to the rear end of the tractor and connected thereto through the usual fifth wheel mechanism. The frame or platform 10 carries the major portion of the load and the rear portion of such frame rests upon a plurality of wheels.

Figure 2:
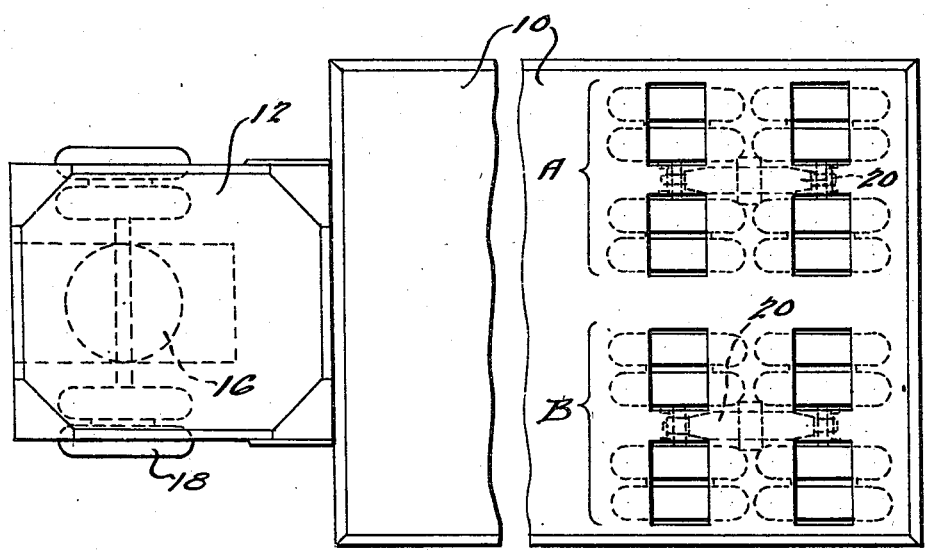
Fig. 2 is a broken, top plan view of the structure shown in Fig. 1.

As shown in Fig. 2, the eight wheels are formed into two groups, thus forming two trucks A and B, composed of four wheels each. These trucks are identical in structure and a description of one will suffice for both.

Each truck comprises a longitudinally extending beam member 20, which is generally U-shaped in transverse section and which has an open bottom providing access to the hollow interior thereof. The member 20 is provided with a transversely extending, central bearing 22, which is adapted to receive therein a pivot shaft 24. Such pivot shaft 24 extends through openings in the sides of the beam 20 and is connected to depending bearing brackets 26 mounted on the underside of the frame 10. Thus, the beam 20 is mounted for oscillatory or rocking movement with respect to the frame 10. The opposite ends of the beam member 20 are formed with trunnion projections 28 and 30, each of which is adapted to have pivotally mounted thereon the hub portion 32 of upwardly and outwardly projecting axles 34. Roller bearings may be interposed between the trunnions and the hub portion 32, and such hub portion may be fixed against axial displacement by means of an end washer 36 and lock nut 38.

The ground-engaging wheels 40 are mounted upon the stub shafts 42 of the axles in the usual way. Conventional, mechanical brakes are provided for each of the wheels and such brakes include the usual drum 44, which may be frictionally engaged by means of a cam operated element 46, which in turn is actuated through the pivotal movement of a depending lever 48. There is, of course, one of such levers for each of the wheels and each lever is pivotally connected to the axle 34 adjacent the upper end of the lever. Through the forward pull on the bottom end of the levers, the brakes are applied.

It will be appreciated that for proper operation of the brakes it is desirable that the braking pressure on all of the wheels be substantially equal and particularly for the pair of wheels mounted on the one axle. In order to accomplish this, the pair of levers 48 at each of the ends of the beam 20 are connected by a transversely extending equalizer bar 50. The lower end of each of the levers 48 is connected by a pivot pin 52 with the forked ends of a clevis 54. The clevis at each end of the equalizer bar 50 is pivotally connected thereto by means of a vertical pivot pin 55.

By actuating the equalizer bars 50, it will thus be seen that the brakes on the pair of wheels at each end of the beam 20 are actuated. The means to actuate each of the equalizer bars 50 includes fluid operating means in the form of an air cylinder 56, having a piston 58 slidably disposed therein with a piston rod 60 projecting through the cap end thereof in the usual way. A spiral spring 62 is also disposed within the cylinder 56 and acts upon the piston 58 to urge it toward its cap end.

The cylinders 56 are mounted on the top side of a plate 64. Such plate 64 is generally complementary in shape to the shape of the open underside of the beam 20 and may be removably bolted thereto by means of bolts 66. The plate member 64 is provided with slots 68 in the ends thereof for a purpose that will be described hereinafter.

An upstanding bracket 70 is secured to the top side of the plate at the central portion thereof and serves to pivotally mount the back ends of the two cylinders 56 by means of pivot pins 72, which cooperate with brackets 74 formed on the rear ends of the cylinders 56. Thus, the cylinders 56 are pivotally mounted to the plate 64 with the rods 60 extending in opposite directions from each other and towards the ends of the plate 64.

A pair of spaced mounting brackets 76 are fixed to the top side of the plate 64 at each end thereof and along the sides of the end slots 68. Such brackets 76 serve to pivotally mount lever members 78, intermediate the ends thereof, by means of pivot pins 80. The major portions of such levers 78 are thus disposed within the hollow interior of the beam 20 with the lower ends thereof projecting downwardly through the slots 68. The upper ends of the levers 78 are pivotally connected to the projecting ends of the piston rods 60 by means of pivot pins 82. The lower end of each lever 78 is connected to a rod member 84 by means of a pivot pin 86. Each of such rod members 84 extends toward its adjacent equalizer bar 50 and is pivotally connected to each equalizer bar at the central portion thereof by means of a clevis 88 and pivot pin 90. A sloppy fit is preferably provided in the connection between the clevis 88 and its equalizer bar 50 so as to allow relatively limited movement between the equalizer bar and the rod 84.

It will thus be seen that the fluid cylinders 56, the piston rod 60, the levers 78 and the rods 84 may all be mounted as a unit upon the plate member 64. It is a relatively simple operation to position the plate 64 onto the beam 20 and when so positioned, the cylinder and piston is self-enclosed, so that it takes up very little room and is protected. Furthermore, due to the compactness of the construction and the fact that the operating elements are mounted as a unit on the plate 64 makes for a relatively easy assembly operation, which is important because of the lack of space in this region.

The compressed air for the cylinders 56 comes from a conventional source through conduits 92 and through T-connections 94 mounted on the frame 10 adjacent the corresponding beam 20. A single conduit 96 leads from each of the connections 94 through an opening 98 in one of the side walls of the beam 20 and extends into the hollow interior thereof. Each of such conduits 94 is connected through a suitable connection with an opening formed in the rear end of the cylinder 56 and communicates with the interior thereof behind the piston 58. Thus, to connect the source of compressed air with the cylinders, it is merely necessary to attach one conduit per cylinder.

Formal changes may be made in the specific embodiment of the invention described without departing from the spirit and substance of the broad invention, the scope of which is commensurate with the appended claims.

What is claimed is:

1. In a heavy duty vehicle, a chassis, a longitudinally extending hollow beam member, said beam member having an open side and being disposed with said open side downwardly, means pivotally mounting said beam member on said chassis, means mounting a pair of wheels at one end of said beam member, brake elements associated with each of said wheels, a plate member removably secured to the bottom edges of said beam member, a fluid operated piston and cylinder unit mounted on said plate member and disposed within the hollow portion of said beam member, means for supplying fluid under pressure to said cylinder, and means operatively connecting said piston to said brake elements.

2. In a heavy duty vehicle, a chassis, a longitudinally extending, hollow beam member, means pivotally mounting said beam member on said chassis intermediate the ends of said beam member, said beam member having an open side extending downwardly providing communication with the hollow portion of said beam member, means mounting a pair of wheels at each end of said beam member, brake elements associated with each of said wheels, a plate member substantially complementary in shape to the open side of said hollow beam member and adapted to be removably attached thereto, a pair of cylinder and piston units mounted on said plate member and adapted to be positioned within the hollow portion of said beam member, means for supplying fluid under pressure to said cylinders, means operatively connecting one of said pistons to the brake elements at one end of the said beam member, and means operatively connecting the other of said pistons to the brake elements at the other end of said beam member.

3. In a heavy duty vehicle, a chassis, a longitudinally extending, hollow beam member, means pivotally connecting said beam member on said chassis, means mounting a pair of wheels at one end of said beam member, brake elements including an operating lever associated with each of said wheels, and means for actuating said brake elements, said last-named means including a fluid operated cylinder and piston mounted on said beam member within the hollow portion thereof, means for supplying fluid under pressure to said cylinder, an equalizing bar connected to said operating lever, a lever member pivotally mounted on said beam member within the hollow portion and having a portion projecting downwardly therebelow, means connecting one end of said lever member to said piston, and means connecting the opposite end of said lever member to said equalizer bar.

4. In a heavy duty vehicle, a chassis, a longitudinally extending hollow beam member, said beam member having an open side and being disposed with said open side downwardly, means pivotally mounting said beam member on said chassis, means mounting a pair of wheels at one end of said beam member, brake elements including an operating lever associated with each of said wheels, a plate member removably secured to the bottom edges of said beam member, a fluid operated piston and cylinder unit mounted on said plate member and disposed within the hollow portion of said beam member, means for supplying fluid under pressure to said cylinder, an equalizer bar connected to said operating levers, a lever member pivotally mounted on said plate member and having one end connected to said piston, the opposite end of said lever member projecting through an aperture in said plate member and being pivotally connected to said equalizer bar.

5. In a heavy duty vehicle, a chassis, a longitudinally extending, hollow beam member, means pivotally mounting said beam member on said chassis intermediate the ends of said beam member, said beam member having an open side extending downwardly providing communication with the interior of said beam member, means mounting a pair of wheels at each end of said beam member, brake elements including an operating lever associated with each of said wheels, an equalizer bar connected to said operating levers at each end of said beam member, a plate member substantially complementary in shape to the open side of said hollow beam member and adapted to be removably attached thereto, a pair of cylinder and piston units mounted on said plate member at the central portion thereof and adapted to be positioned within the hollow portion of said beam member, means for supplying fluid under pressure to said cylinders, a lever member pivotally mounted on said plate member at each end thereof and projecting downwardly through an aperture therein, means connecting the inner end of each of said lever members to its adjacent piston, and means connecting the projecting ends of each of said lever members with its adjacent equalizer bar.

6. In a heavy duty vehicle, a chassis, a longitudinally extending, hollow beam member having an open side wall, removable means enclosing said open side wall, means pivotally connecting said beam member to said chassis, means mounting a pair of wheels at one end of said beam member, brake elements associated with each of said wheels, and means for actuating said brake elements, said last-named means, including a fluid operated cylinder and piston insertable through said open side wall and mounted on said beam member within the hollow portion thereof, means for supplying fluid under pressure to said cylinder, and means operatively connecting said piston to said brake elements.

7. In a heavy duty vehicle, a chassis, a longitudinally extending, hollow beam member having an open side wall, removable means enclosing said open side wall, means pivotally mounting said beam member on said chassis intermediate the ends of said beam member, means mounting a pair of wheels at each end of said beam member, brake elements associated with each of said wheels, means for actuating said brake elements, said last-named means including a pair of fluid operated cylinder and piston units insertable through said open side wall and mounted directly on said beam member within said hollow portion, means for supplying fluid under pressure to both of said cylinders, means operatively connecting one of said pistons to the brake elements at one end of said beam member, and means operatively connecting the other of said pistons to the brake elements at the other end of said beam member.

8. In a heavy duty vehicle, a chassis, a longitudinally extending, hollow beam member having an open side wall, removable means enclosing said open side wall, means pivotally connecting said beam member to said chassis, means mounting a pair of wheels at one end of said beam member, brake operating elements associated with each of said wheels and located exteriorly of said beam member, and means for actuating said brake elements, said last-named means including a fluid operated cylinder and piston insertable through said open side wall and mounted on said beam member within the hollow portion thereof, means for supplying fluid under pressure to said cylinder, and means extending from the interior of said beam member to a position exteriorly thereof operatively connecting said piston to said brake operating elements.

9. In a heavy duty vehicle, a chassis, a longitudinally extending, hollow beam member having an open side wall, removable means enclosing said open side wall, means pivotally mounting said beam member on said chassis intermediate the ends of said beam member, means mounting a pair of wheels at each end of said beam member, brake operating elements associated with each of said wheels and located exteriorly of said beam member, means for actuating said brake elements, said last named means including a pair of fluid operated cylinder and piston units mounted directly on said beam member within said hollow portion, means for supplying fluid under pressure to both of said cylinders, means extending from the interior of said beam member to a position exteriorly thereof operatively connecting one of said pistons to the brake operating elements at one end of said beam member, and means extending from the interior of said beam member to a position exteriorly thereof operatively connecting the other of said pistons to the brake operating elements at the other end of said beam member.

10. In a heavy duty vehicle, a chassis, a longitudinally extending, hollow beam member, means pivotally connecting said beam member to said chassis, means mounting a pair of wheels at one end of said beam member, brake operating elements associated with each of said wheels and located exteriorly of said beam member, and means for actuating said brake elements, said last named means including a fluid operated cylinder and piston mounted on said beam member within the hollow portion thereof, means for supplying fluid under pressure to said cylinder, and means extending from the interior of said beam member to a position exteriorly thereof operatively connecting said piston to said brake elements.

FREDERICK M. REID.